US006537629B1

(12) United States Patent
Ensinger

(10) Patent No.: US 6,537,629 B1
(45) Date of Patent: Mar. 25, 2003

(54) SPACER

(76) Inventor: Wilfried Ensinger, Rudolf-Diesel-Strasse 8, D-71154 Nufringen (DE)

( * ) Notice: Subject to any disclaimer, the term of this patent is extended or adjusted under 35 U.S.C. 154(b) by 48 days.

(21) Appl. No.: 09/641,513

(22) Filed: Aug. 18, 2000

Related U.S. Application Data

(63) Continuation of application No. PCT/EP99/00454, filed on Jan. 23, 1999.

(30) Foreign Application Priority Data

Feb. 21, 1998 (DE) .......................................... 198 07 454

(51) Int. Cl.[7] .............................. B32B 1/08; E06B 3/24

(52) U.S. Cl. ..................... 428/36.9; 428/34; 428/36.91; 428/156; 428/167; 428/188

(58) Field of Search .............................. 428/34.1, 36.9, 428/34, 188, 213, 167, 156, 131, 137, 402, 376; 52/786.1, 786.13, 172

(56) References Cited

U.S. PATENT DOCUMENTS

| | | | | |
|---|---|---|---|---|
| 4,536,424 A | * | 8/1985 | Laurent | ....................... 428/34 |
| 5,568,714 A | | 10/1996 | Peterson | |

FOREIGN PATENT DOCUMENTS

| | | |
|---|---|---|
| DE | 92 14 799 | 12/1992 |
| EP | 0 113 209 | 7/1984 |
| EP | 0 127 739 | 12/1984 |
| EP | 0 601 488 | 6/1994 |
| GB | 2 162 228 | 1/1986 |
| WO | WO 91/00409 | 1/1991 |
| WO | WO 94/17260 | 8/1994 |
| WO | WO 95/06797 | 3/1995 |

* cited by examiner

*Primary Examiner*—Donald J. Loney
(74) *Attorney, Agent, or Firm*—Barry R. Lipsitz

(57) ABSTRACT

To achieve a spacer with adequate longitudinal stiffness and straightness, without this being accompanied by excessive heat transfer and inflated production costs, it is recommended that the ratio of the thickness of the legs to the thickness of the side walls is 0.8 or less and that the thermal resistance of the legs is higher than that in the side walls.

35 Claims, 3 Drawing Sheets

FIG.7a
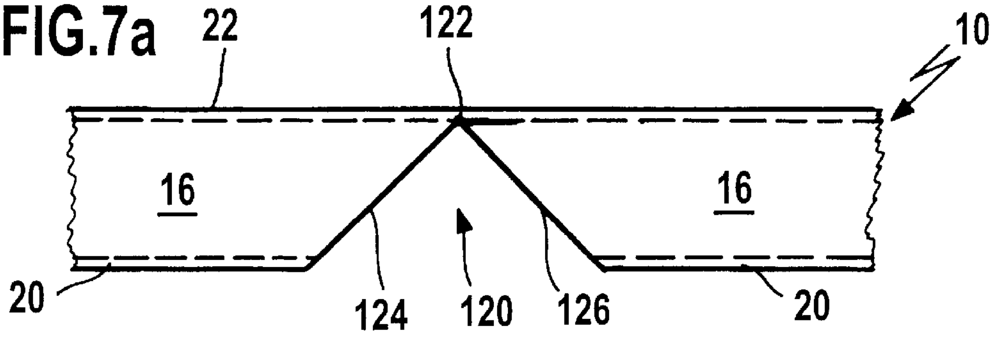
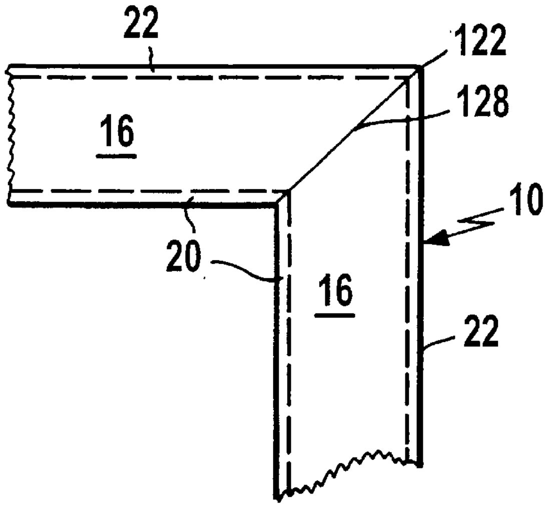
FIG.7b
FIG.8a
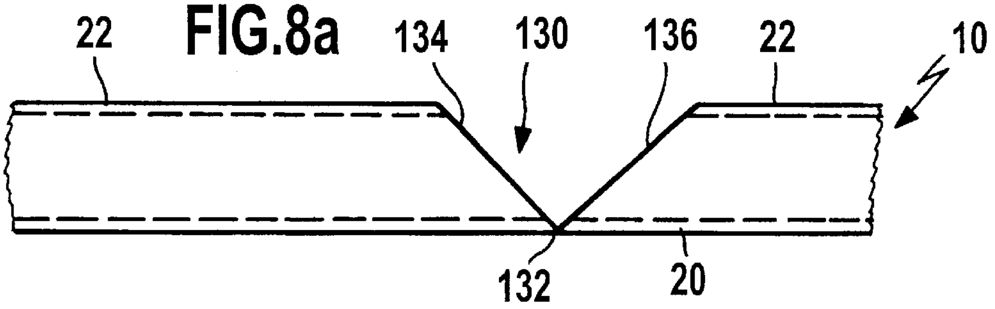
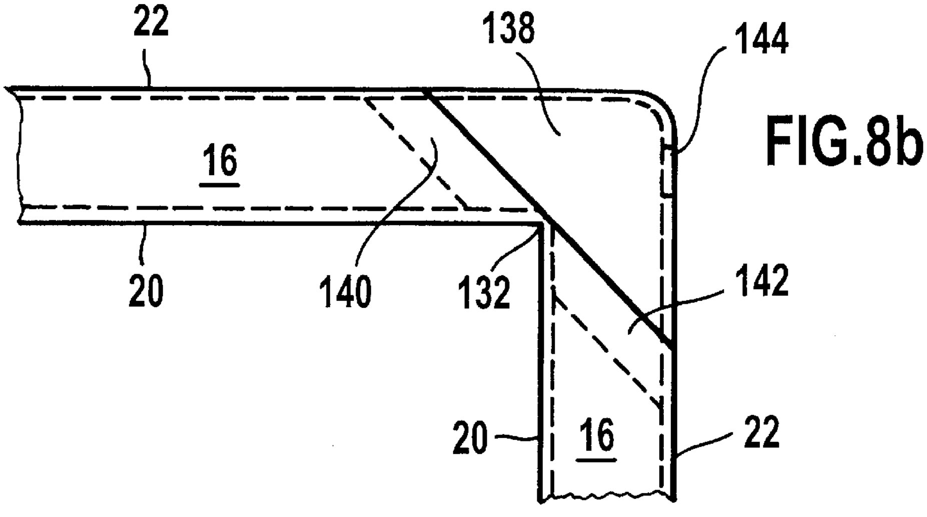
FIG.8b

SPACER

This application is a continuation of international application number PCT/EP99/00454 filed on Jan. 23, 1999.

The present invention concerns a plastic spacer for insulating glass elements, wall panels or similar objects. Such spacers are used, for example, to keep the glass sheets in an insulating glass pane parallel to each other and, combined with sealant, seal the area formed between the glass sheets at its edges and contain desiccant.

FIELD OF THE INVENTION

Spacers are frequently employed in the form of hollow metal profiles (stainless steel or aluminium). The profile has two parallel side walls in contact with the glass sheets and two legs extending between the side walls, which essentially run at right angles to the side walls of the hollow profile and join these to each other.

As far as their bonding properties with conventional sealants and sealing against water vapour penetrating the area between the sheets from outside are concerned, they meet the requirements. Nevertheless, the heat flow at the sheet edges, depending on the metallic materials, is excessive. Even if the area between the sheets is filled with inert gases such as e.g. xenon or krypton, a serious loss in insulation quality is observed, particularly in the boundary area set into the window or facade frames.

BACKGROUND OF THE INVENTION

Proposals to use plastic instead of metallic materials, as specified in DE-A-3302 659. DE-A-127 739, EP-A-0 430 889 and EP-A-0601 488 naturally produced an improvement in relation to heat insulation in the boundary area of the insulating glass element.

By doing this, however, serious problems characteristic of plastic result concerning:

- the inadequate longitudinal stiffness and straightness of a plastic spacer compared with one produced from metallic material, which leads to considerably higher production cost and waste during manufacture; this problem can be countered to an extent by increasing the wall thicknesses of the profile. However, the result then is:
- excessive heat transfer across the relatively large plastic wall thicknesses; and
- increased production costs as a result of the higher material consumption.

OBJECTS OF THE INVENTION

The purpose of the present invention is to supply a common solution to the conflicting problems mentioned above using spacers made with a plastic base.

SUMMARY

The invention purports to solve the problem in the spacers initially described by choosing the ratio of the thickness of the legs to the thickness of the side walls as 0.8 or less and/or the thermal resistance in the legs to be higher than that in the side walls.

Limiting the thickness ratio of the legs and side walls to 0.8 or less gives more freedom to improve longitudinal stiffness by increasing the wall thickness or the side wall thickness while simultaneously limiting the thickness of the legs to the dimensions required for transverse stability of the hollow profile, thus limiting heat transfer at right angles to the length of the profile from one side wall to the other to a minimum.

The choice of a higher thermal resistance in the legs provides reduced heat transfer at right angles to the length of the profile (in the leg level). As the legs form a limiting factor for heat transfer performance, it is now possible to plan and implement reinforcement of the plastic in the side walls with a view to improving longitudinal stiffness, in the main independent of heat transfer considerations. Therefore it is possible to use plastic/reinforcing material combinations, which must provide an optimum in relation to their joining properties, especially bonding between synthetic and reinforcing materials, together with improved mechanical properties, regardless of their influence on heat conducting capability.

The principle of construction of the spacer as specified in the invention makes the longitudinal stiffness required to handle hollow profiles during the production of insulating glass elements feasible due to the freedom to increase the thickness of the side walls, while still providing the advantage of reduced heat transfer associated with plastic and, moreover, the latter can be minimised due to the comparatively thin construction of the legs.

The side wall thickness of a hollow profile in a 20 mm wide spacer is e.g. 3 mm or less for preference.

The choice of wall thickness ratio and/or reinforcement of the plastic increases the longitudinal stiffness, preferably so that the profile in the level of the side walls bends at most by about 100 mm/m of profile length. This saves nugatory expenditure as the conventional devices in metallic spacers can be used.

In addition, the transverse stability required for the hollow profile is the principal determinant for the thickness of the legs, i.e. the capability of the profile to support and retain both glass sheets of the insulating glass element at a defined spacing, even if wind forces acting on the sheets product tensile and/or pressure loading.

Surprisingly, it became apparent at the same time that, as a result of the lower wall thickness of the legs, together with the elasticity properties inherent in plastic, the hollow profile acquires a capacity to adapt in the transverse direction, which allows it to match its cross section at least partially to distortion of the glass sheets (the effect of wind forces). In addition, the legs permit elastic elongation or compression in the transverse direction, so that the position of the side walls of the profile can at least partially follow the distortion or bending of the glass sheets.

This has the effect of lowering the demands on the sealing components placed between the spacer and the glass sheets considerably when the glass sheets are subjected to tension and pressure, which is not only good for the long term stability of the sealing components themselves, but also noticeably counteracts separation tendencies in the glass/sealing component and sealing component/spacer boundary areas.

Limiting the thickness ratio to about 0.6 or less, or even to 0.4 or less, provides a further decrease in heat transfer, thus achieving or simultaneously improving on the above-mentioned additional benefits.

It is possible to reduce the thickness of the side walls and, above all, the legs, by arranging one or more links inside the cavity parallel to the side walls, and still maintain comparable longitudinal stiffness. It is possible to form these links extending, in the main, across the entire height of the hollow profile and, in this way, join both legs to each other. Alternatively, the links can also form ribs running along the profile, with an edge standing proud of a leg.

The plastic can be reinforced to minimise wall thickness further, while maintaining or even increasing rigidity, in particular the longitudinal stiffness as well.

In addition, the proportion of reinforcing material in the plastic of the side walls will be higher than that in the legs. This measure is particularly relevant considering that numerous preferred reinforcing materials have a higher specific thermal conductivity than the plastic itself. By reinforcing the plastic in the legs as well, it is possible to reduce their thickness further, though by doing this, in the light of the effect this has on the thermal conductivity of the hollow profile, it is not possible to increase the proportion of reinforcing material arbitrarily. With respect to the thermal conductivity of the plastic, it is beneficial to seek an optimum ratio between reinforcing materials and costs.

With regard to minimising the heat transfer properties of the legs, it is preferable to reinforce these only in part. In this connection, there is the option of reinforcing strip shaped areas running parallel to the profile length, maintaining separation from the side walls and the legs if these are present. This solution strengthens an area of the legs which is mechanically weaker and limits the heat transfer through the legs in another, by means of the non-reinforced areas of the legs adjoining the side walls and, if necessary, the links.

Reinforcing fibres are the first choice for reinforcing materials, preferably chosen from among glass fibres, carbon fibres, aramide fibres and/or natural fibres. These can be inset as short fibres, long fibres or, if necessary, continuous fibres, or any combination of these.

In addition to reinforcing fibres, and as an alternative if necessary, it is also possible to strengthen plastic with particle shaped materials, i.e. especially in granular or disc shape. In this connection, Wollastonite, mica and talc are particle shaped materials.

If reinforcing materials are set into the side walls and, as required, the links, for strengthening purposes, it is advantageous to incorporate these in the plastic, preferably oriented along the hollow profile.

If fibres are used to reinforce the legs, it is advantageous to arrange these crossing one another, as this produces a larger heat conduction path in the individual reinforcing fibres, i.e. the hollow profile has a lower heat transfer capacity.

It is advisable to use fibres, as required, in the form of linked material such as e.g. a fibre mat or net, to implement the criss-cross arrangement of the reinforcing fibres.

From the aspects discussed above, the proportion of reinforcing materials as a percentage by weight will be higher in the side walls than in the legs. This is equally applicable to links parallel to the side walls, possibly placed in the hollow profile cavity.

Sheet metal strips arranged parallel to the side walls are a particularly cost effective method of reinforcing the latter. These strips can be applied to the profile externally, in particular by bonding. It is, however, preferable to embody the sheet metal strips in the plastic of the side walls to avoid from the outset corrosion problems, bonding problems with sealing and bonding components or even handling problems with profiles produced initially without the sheet metal strips. Moreover, it is possible in this way to avoid the bonding process as a production stage.

It is advantageous to use perforated sheet metal strips, which permit a particularly good mechanical bond with the plastic of the side walls.

However, sheet metal strips provided additionally with indentations or surface irregularities produced in other ways have advantages which, nonetheless, do not produce quite the same mechanical bonding effect with the surrounding plastic as do perforated sheet metal strips, especially when they are incorporated in the side walls.

Despite the higher thermal conductivity of the metallic material from which sheet metal strips are made, these lead at best to an imperceptible increase in the heat transfer qualities of the hollow profile.

Typical sheet metal thicknesses are in the region of 0.1 to 1.0 mm, and, if the sheet metal strips are embedded in the side walls, it is preferable for the sheet metal thickness not to be greater than half the thickness of the side walls.

It is also possible to use sheet metal strips independently to reinforce links in a profile.

It is possible to achieve a further reduction in heat transfer through the profile with synthetic foam materials. Alternatively, either for this purpose or to complement it, it is possible to consider reinforcing materials/filling material such as e.g. hollow glass balls, hollow fibres etc., which contain a certain volume of gas.

It is beneficial if the spacer as specified in the invention has longitudinal and/or transverse grooves on the external surfaces of the side walls. In this connection, it is possible to improve bonding of the sealing components with the spacer.

It is possible to achieve a similar effect with the spacer as specified in the invention by providing retention agents, especially in the form of indentations, irregularities or undercuts for quasi-mechanical anchoring of the sealant for the side walls to its external surfaces. It is equally possible to do this with the external surfaces of the sheet metal strips if these are placed externally to reinforce the side walls.

The use of a protective layer, for example an epoxy layer or an inorganic/organic compound layer, which again provides other functions, namely bonding of the sealant and hollow profile, together with a certain degree of UV protection, is a critical step concerning the chemical resistance of plastic spacers. It avoids the need to use more expensive sealing components designed specifically for plastic. At the same time, such layers provide additional thermal insulation.

Whereas strict limits for spacer production are drawn concerning the selection of the plastics to be used as regards their chemical resistance to sealing and bonding component materials, such as e.g. butyl bonding components, polysulphide, polyurethane and silicone sealing components and their tendency to give off gas forming materials (fogging problems) and their diffusibility (vapour diffusion sealing)— a very good plastic in this respect is Styrol-acrylonitrile-copolymer— it is also possible to use a suitable layer of significantly cheaper plastic, such as e.g. PVC, polyacryl, polyester, polystyrol or polypropylene.

If suitably selected, the protective layer can also perform the function of a vapour diffusion barrier. Such a vapour barrier will be extremely advisable for many plastics, to avoid water vapour entering the space between the glass sheets and hence premature depletion of the desiccant in the hollow profile, which would result in condensation forming inside the insulating glass elements.

The recommended epoxy layer, in its function as a vapour barrier, has the advantage, compared with the metal foils conventionally recommended, of being more resistant to crack formation and detachments appearing than metal foils attached to or embodied in the profile. Moreover, this will avoid the problem associated with widely differing coefficients of thermal expansion (bimetallic effect).

The recommended protective layer specified in the invention can also improve chemical resistance to sealants so that is solves long observed tensile fracture corrosion problems.

The outer leg can be provided on the outside with a diffusion barrier in the form of thin aluminium foil, stainless steel foil, or plastic foil coated either with vaporised metal or inorganic/organic compounds.

This diffusion barrier can be attached directly to the plastic of the leg and, as required, enclosed in an epoxy layer. A further option is to introduce the metal foil to the plastic during the extrusion process.

It is also possible to imagine an epoxy layer placed between the diffusion barrier and the outer surface of the leg.

In the conventional manufacturing process for metallic spacers for insulating glass framing elements, pre-cut hollow profile extrusions are bent to form in the corners, with the inside legs under strain. If this technique is applied to plastic spacers, production problems which are difficult to resolve occur as a result of the elastic plastic returning to its original shape, such as e.g. unacceptable positioning and form deviations in the area of the corners. Moreover, even if the area to be bent is warmed, excessive distortions, delays, cracks and high production times occur. Existing diffusion barrier coatings in the area of the corners processed in this way may not remain undamaged and, frequently, may even be totally destroyed.

As, in addition, the bending area must be chosen to be relatively large due to the properties of plastics compared with metals, the interior of the hollow profile becomes significantly constricted which, on one hand, makes filling the profile cavity/cavities with desiccant very difficult and, on the other, leads to a decrease in the sealing surface area.

The production of polygon-shaped frames as specified in the invention, in which each corner of the hollow profile areas forming the frame is provided with a V-shaped opening, produced by removing the inner leg while leaving the outer leg essentially intact, the side walls tapering towards the corner, counters this. The contact areas or cut edges of the side walls of the V-shaped opening are folded inwards to form the frame.

Alternatively, the spacer, forming a polygon-shaped frame, in which the areas forming each corner of the frame of the hollow profile contain a V-shaped opening extending over the whole width of the outer leg and, essentially, over the entire height of the side walls, in which the vertex of the V-shaped opening is in the inner leg can have a triangular cap placed on the opened out legs to form the corner.

In both alternatives, the contact joints to be produced in the area of the corners are to be firmly joined to one other, preferably by means of butt, laser, ultra-sound or high frequency welding or bonding.

BRIEF DESCRIPTION OF THE DRAWINGS

These and further advantages of the present invention are explained in the following with the aid of the diagram. It shows in detail:

FIGS. 7*a* and *b* corner area of a frame as specified in the invention, formed from spacers as specified in the invention;

FIGS. 8*a* and *b* alternative as specified in the invention for forming a corner area of a frame from spacers as specified in the invention.

SPECIFIC DESCRIPTION

Figure 1:
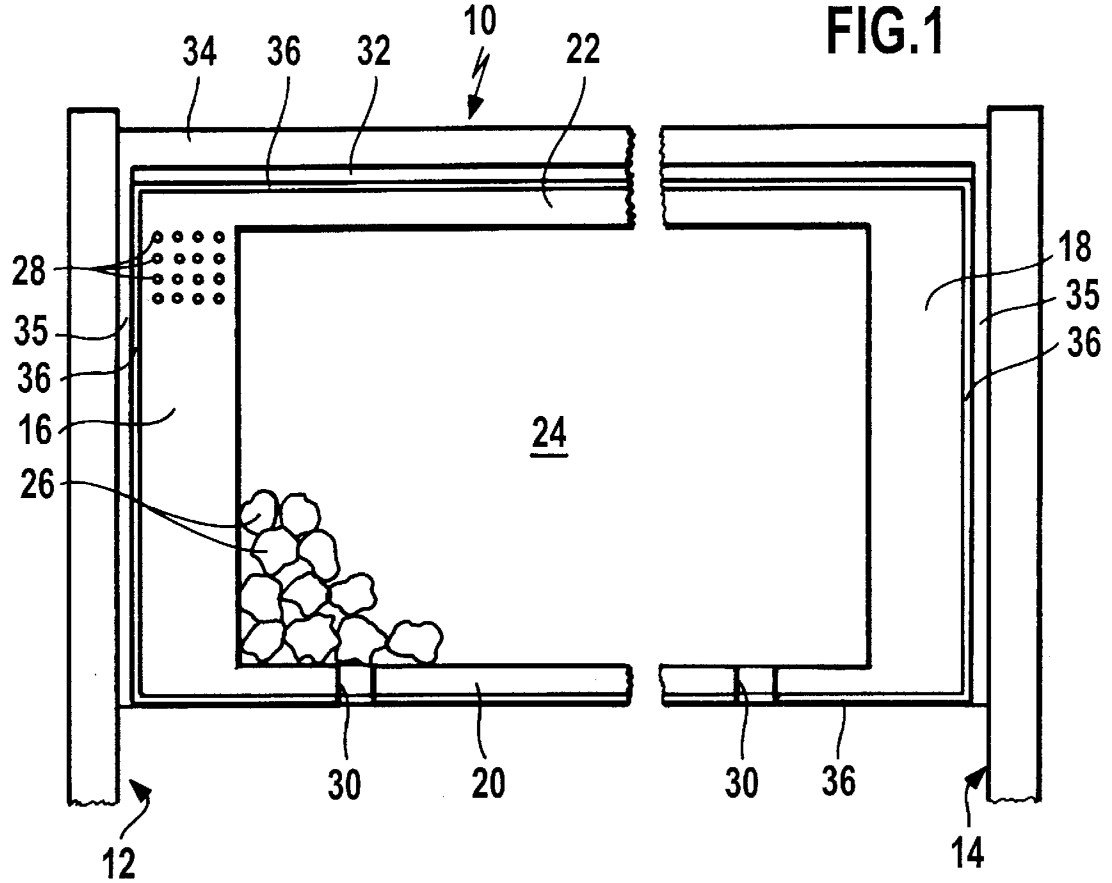
FIG. 1 A sectional view of part of an insulating glass element with a spacer as specified in the invention in accordance with a first design.

FIG. 1 shows a spacer as specified in the invention, in general designated by the reference number 10, which is set between two glass sheets 12 and 14 and this maintains a defined spacing.

The spacer 10 has an essentially right-angled hollow profile in cross-section, which is formed by two side walls 16 and 18 and two legs 20 and 22. Both side walls 16, 18 are arranged parallel to the glass sheets 12, 14 and are joined to each other by the two legs 20, 22 to form a cavity 24, which contains the desiccant 26. This desiccant is shown in FIG. 1 as only a few grains, but normally fills the whole of cavity 24. According to the invention, the ratio of the thickness of the legs 20, 22 to the thickness of the side walls 16, 18 is about 0.35. The longitudinal stiffness of the hollow profile is enhanced in this design example by means of reinforcing fibres 28 parallel to the length of the profile incorporated into the side walls (for the sake of clarity only a few reinforcing fibres are shown). These reinforcing fibres, essentially of the same shape, will for choice be distributed evenly over the cross-section of the side walls.

There is essentially a free choice for the reinforced fibre proportions in the spacers as specified in the invention, even if the reinforcing fibres 28 should have a much higher thermal conductivity than the surrounding plastic for, in the spacer as specified in the invention, the heat transfer capacity across the insulating glass element is effectively limited by virtue of the comparatively low thickness of the legs 20, 22. This even permits a certain reinforcing fibre component in the legs 20, 22 themselves which, in conjunction with FIG. 6, will be discussed in greater detail.

Whereas the outer leg 22 forms a closed surface, the leg 20 situated inside the insulating glass element has numerous discontinuities 30, which connect the space between both glass sheets 12, 14 with the cavity 24 of the spacer-hollow profile. In this way, water vapour enclosed in the space can reach and be absorbed by the desiccant 26.

To prevent additional water vapour entering by means of diffusion through the plastic of the spacer as far as possible, a vapour barrier 32 made, for example, from thin metal foil, is placed on the outside of the leg 22. The vapour barrier 32 is illustrated in FIG. 1, much enlarged for the sake of clarity. Vaporised metal layers on the outside of the leg 22 already have adequate vapour repellent properties.

The spacer 10 is bonded to the glass sheets by means of sealing component 34, e.g. polysulphide sealing components, and bonding components 35, e.g. butyl bonding components, so that a sealing/bonding component balance is produced, which extends in essence across the entire height of the side wall 16 of the spacer 10 via its leg 22 and outwards again, in essence across the entire height of the side wall 18.

To improve bonding of the sealing component 34 (frequently made from polysulphides, polyurethanes or silicones) or the (butyl) bonding components 35 with the plastic of the spacer 10 and simultaneously produce UV protection for the part of spacer 10 (outer surface of leg 20) exposed to the sun's rays, the hollow profile of the spacer is provided with an epoxy coating 36 on all its outer surfaces. The previously described vapour barrier 32 is attached to the epoxy coating 36 applied directly to the leg 22. This, however, is not essential and the reverse sequence for layers 32 and 36 is possible without any detrimental effect. For this purpose, metal vaporisation must only be carried out before the epoxy coating or the metal foil of vapour barrier 32 is attached to the leg 22.

If a plastic, which is known to give off or allow passage to gas forming materials, is chosen for manufacturing the spacer, it is advantageous to provide the inner surfaces of the hollow profile with the epoxy coating as well, representing an effective measure against so-called fogging.

Figure 2:
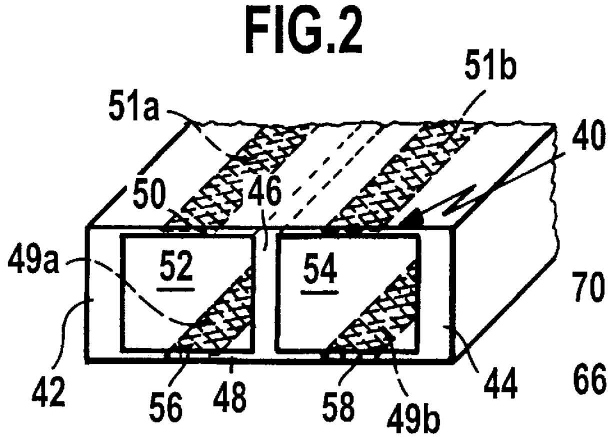
FIG. 2 An isometric projection of a second design for the spacer as specified in the invention.

FIG. 2 shows a second design 40 of the spacer as specified in the invention, which illustrates a development of the spacer 10 from FIG. 1. A parallel link 46 is placed for this purpose between both side walls 42 and 44, extending across the entire height of the spacer's hollow profile and joined to both legs 48 and 50, as with both side walls 42, 44. This measure makes it possible to reduce further the thickness of both legs 48, 50 in relation to the side walls 42, 44, which results in an improvement in insulation qualities. Link 46 also improves longitudinal stiffness. Link 46 divides the hollow profile of the spacer 40 into two cavities 52 and 54 which are joined at any given time to the space between the glass sheets of an insulating glass element via discontinuities 56 and 58. Cavities 52, 54 are filled with desiccant as described above in the case of cavity 24. The legs 48, 50 can be provided with strip shaped reinforcing materials to improve mechanical stability; shown in FIG. 2 as strip shaped fibre mats 49*a*, 49*b*, 51*a* and 51*b*. The reinforcing materials are normally incorporated in the plastic. In the illustration in FIG. 2, the fibre mats 49*a*, 49*b*, 51*a* and 51*b* are only drawn showing for the sake of clarity.

Figure 3:
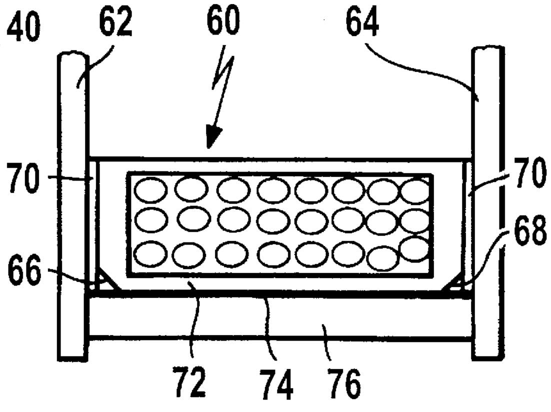
FIG. 3 Sectioned view of a third design for the spacer as specified in the invention.

FIG. 3 shows a spacer 60 bonded between two glass sheets 62 and 64. The construction of the spacer 60 corresponds roughly with that described already in conjunction with FIG. 1, therefore merely the differences between them will be covered here.

The external profile of the spacer 60 differs from that of spacer 10 in that the longitudinal edges 66, 68, facing away from the space formed between the glass sheets 62, 64 are oblique, which increases the sealing surfaces and the volume of the sealing component. Furthermore, the spacer 60 does not require epoxy coating because it is a suitable material choice for use with the bonding component 70 (butyl bonding component). The vapour barrier 74 is also attached to the outer leg 72 of the spacer 60 without any intermediate coating. Finally, during assembly of the insulating glass element the external surface of the spacer 60 (vapour barrier 74) is coated with a sealant 76, which is normally manufactured using a polysulphide as a base.

Here, as with other design examples described and still to be described, a multi-layer plastic foil of the inorganic-organic hybrid network type including layer components such as e.g. A1203, SiO2 and amorphous, diamond type carbon can act as a vapour or diffusion barrier instead of metal foil or metal vaporisation. The metal layers, which are applied either directly to the spacer or a synthetic foil, can be attached by vaporising (single or multi-layer), galvanically, sputtering, flame spraying, arcing, plasma spraying, plasma polymerisation etc.

Figure 4:
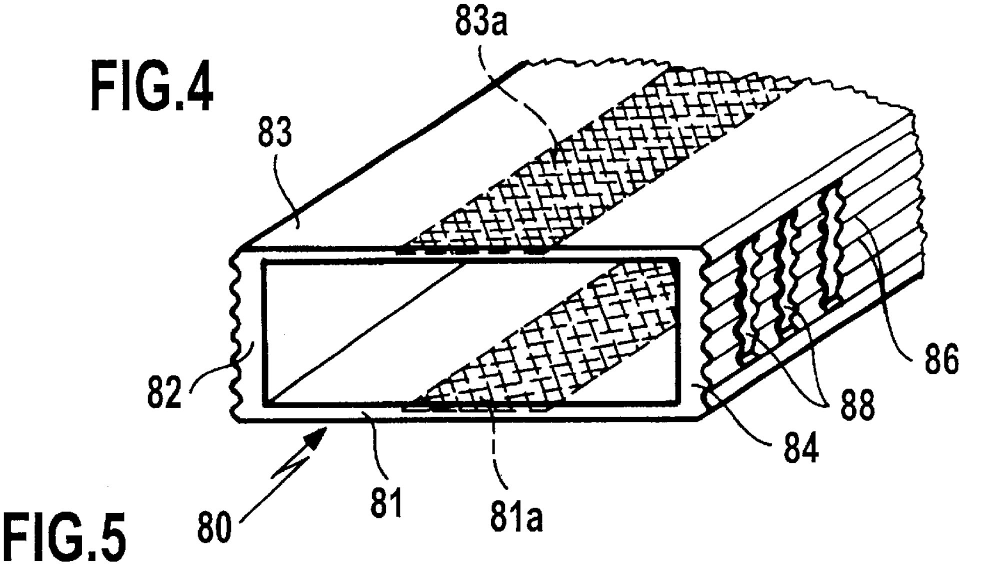
FIG. 4 Isometric projection of a fourth design for the spacer as specified in the invention.

FIG. 4 shows a further variation of the hollow profile of the spacer specified in the invention as spacer 80. To avoid repetition, once more only the differences from spacer 10 are discussed here. The side walls 82 and 84 of the spacer 80 are provided with longitudinal grooves on their external surfaces. These improve the bonding of the sealing component with the spacer surface. In addition, it is possible to combine these longitudinal grooves with transverse grooves running vertically for this purpose which can also, alone at this time for certain applications, offer an adequate improvement in bonding to the spacer surface. Alternatively, for this purpose, it is also possible to work with the surfaces of side walls 82, 84 roughened, or in general with retention agents, which provide mechanical bonding of the sealing component with the spacer surface by means of undercut areas. The legs 81, 83 are reinforced 81*a*, 83*a*, in strip shaped areas, which are separated from the side walls and arranged parallel to the length of the hollow profile of the spacer 80.

Figure 5:
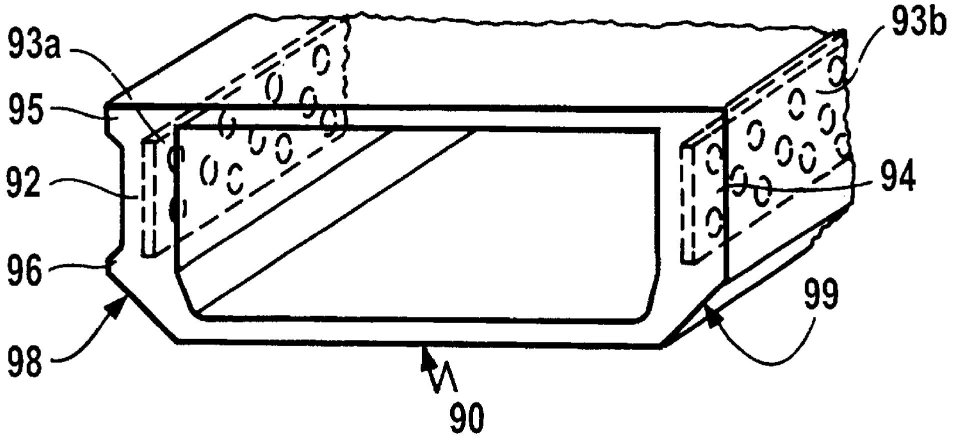
FIG. 5 Sectioned view of a fifth design for the spacer as specified in the invention.

FIG. 5 shows a further variant for the retention agent with the aid of a spacer 90, whose side walls 92, 94 are only drawn to explain different profile variants. Side wall 92 is shown with reinforcing ribs 95, 96, which lodge simultaneously in the sealing component, acting as an anchor, and hence provide mechanical bonding with the sealing component. The side walls 92, 94 slope sharply at their ends 98, 99, facing away from the space to be formed between the glass sheets, to enlarge the sealing surfaces and the sealant volume, which follows a defined shaping of the surfaces of the side walls 92, 94 facing the inside of the hollow profile to guarantee adequate wall thickness in this area of the side walls 92, 94. Perforated steel sheet strips 93*a*, 93*b* are incorporated for stiffening purposes in the plastic of the side walls 92, 94 over the entire length of the hollow profile.

Figure 6:
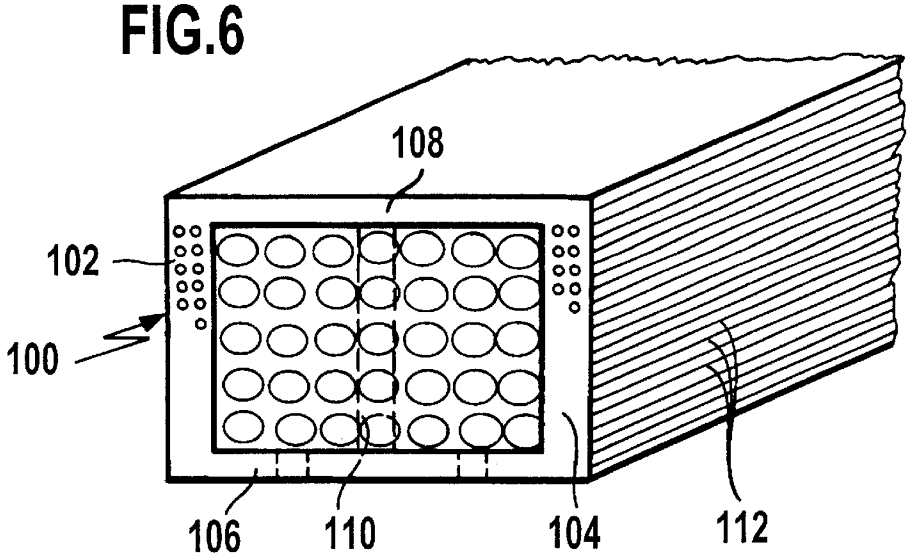
FIG. 6 Isometric projection of a fibre reinforced spacer as specified in the invention.

FIG. 6 illustrates a spacer 100 as specified in the invention with a simple right-angled profile. The effects of reinforcement with reinforcing fibres will be discussed with the help of this figure, which possibly forms an analogy for all other designs described. The hollow profile of spacer 100 is formed by side walls 102, 104 and legs 106, 108. The cavity of spacer 100 can be divided independently by a link 110 (dotted line in the illustration), which permits the legs 106, 108 to be reduced in thickness. As one of the main problems in handling plastic spacers is their lower longitudinal stiffness, as already explained in conjunction with FIG. 1, it is beneficial to reinforce the plastic of the side portions with reinforcing fibres 112 arranged parallel to the length of spacer 100. It is possible to vary the components of reinforcing fibres in plastic over wide limits, essentially directed at the effect striven for, namely to improve the longitudinal stiffness. Because of the thinner construction of the legs 106, 108 as specified in the invention, a comparatively high proportion of reinforcing fibres in the side walls 102, 104 possibly makes an insignificant contribution to an increase in the heat transferred across the side walls 102, 104 straight through the complete hollow profile. Certainly the heat transfer performance becomes quite significant in the design of the hollow profile of the spacer as specified in the invention, as a result of the constructive design of the legs 106, 108. As these legs 106, 108 necessarily make no contribution to the longitudinal stiffness of the profile, and this all the more as the side walls 102, 104 have already been additionally stiffened through longitudinal fibres 112, the legs 106, 108 are designed in the main expressly to fulfil their function. This is equally applicable in the event that the side walls 102, 104 are reinforced with sheet steel strips as shown in FIG. 5.

The function of the legs 106, 108 is simply to maintain the side walls 102, 104 at a defined spacing and, moreover, to absorb forces which act on the spacer profile across the glass sheets of an insulating glass element, especially as the result of wind pressure or wind suction. To be able to fulfil such tasks with the wall thickness reduced further, it is also possible to reinforce the legs 106, 108 in particular with reinforcing fibres. As the legs have to absorb transverse forces, a reinforcement which can absorb such forces is beneficial. The use of reinforcing fibres arranged in a crossing formation, assuming simultaneously a sharp angle along the spacer, has proven especially suitable for maintaining the heat transfer capacity of the legs 106, 108 at as low a value as possible. This angle should preferably be between 40° and 60° as, with this, on one hand transverse forces can be adequately absorbed and, on the other, the higher specific thermal conductivity associated with reinforcing fibres, because of the increased transfer path (fibre length from one side wall to the other) allows a lower heat transfer capacity to be achieved. Nonetheless, the proportion of reinforcing fibres in the plastic of the legs 106, 108, if definitely available, should clearly be lower than in the side walls, as here, naturally, every increase in the proportion of reinforcing fibres leads directly to an increase in the heat transfer capacity. The option of reduced the wall thickness further, with an increased proportion of reinforcing fibres in the legs 106, 109, does not compensate unconditionally for the resultant increase in heat transfer capacity. Consequently, there is the option to determine an optimum, depending on the specific thermal conductivity of the fibres on one hand and the heat transfer capacity of the plastic of the legs and, on the other, consideration of the reinforcing effect of the reinforcing fibres and the choice of wall thickness, with reference to the profile width chosen.

Examples of the reinforcement effects due to reinforcing fibres are given in the following table.

For the typically dimensioned hollow profile cross-section illustrated in FIG. 1, the table, in which for comparison the values for a normal aluminium profile (example 1) are also given, compares various wall thicknesses and proportions of reinforcing fibres with the achievable gains in longitudinal stiffness of the hollow profile as specified in the invention.

Examples 1 and 2 concern profiles which use a completely non-reinforced plastic. In examples 4, 5 11 and 12, only the side walls are reinforced with glass fibres, whereas the legs are in general free of reinforcing fibres and materials. Values for the glass fibre content and the designation of the type of glass fibre are placed in the table in parentheses to clarify these details.

Examples 6, 7, 8 and 9 show profiles for comparison, giving a comparative distribution of reinforcing fibres in the plastic of the legs and the side walls. In Examples 15 and 16, the plastics in the side walls and the legs are also reinforced in the same way. From these examples, it is also possible to infer that a strip shaped reinforcement of the legs will have an additional positive effect on the longitudinal stiffness ($f_y$) of the profile in the level of the side walls.

Examples 13 and 14, finally, apply another reinforcing principle. Here, in the side walls, sheet metal strips are incorporated in the material in a similar way to that shown in FIG., 5. However, the values given in the table relate to sheet metal strips with no perforations. In this example, the height of the sheet metal strips is 6.Omm. These examples show that reinforcing the side walls with simple (steel) sheet metal strips produces obvious gains in longitudinal stiffness. The longitudinal stiffness in example 14, for example, in which a 1.0 mm thick sheet metal strip is used for reinforcement, is comparable with the reinforcing effect that reinforcing with a content of 70% component by weight can achieve (cf. Examples 11 and 12). Production costs are, of course, significantly better with hollow profiles reinforced with sheet metal strips. Fibres can also be incorporated independently with the plastic adjacent to the sheet metal reinforcing strips in the same profile, which can be expected to have an additional positive effect on the longitudinal stiffness.

The dimensions width/outer (B) and width/internal (b) refer to the profile dimensions measured parallel to the leg level 20, 22, whereas the values height/outer (H) and height/inner (h) designate the profile dimensions parallel to the level of the side walls 16, 18.

The wall thickness $d_v$ refers to the thickness of the side walls 16, 18, the wall thickness $d_h$ to the thickness of the legs 20, 22. The bending $f_y$ shows the bending of a 1 m long hollow profile under tension on one side in the level parallel to the side walls 16, 18, whereas $f_x$ repeats the corresponding parameter if the profile is rotated through 90° under tension and the bending is set in the level parallel to the legs 20, 22.

| Profile material | Ex. No | Glass fibre type | GF content Component % | B Outer width | H Outer height | $d_v$ Vertical wall thickness mm | $d_h$ Horizontal wall thickness mm | b Inner width | h Inner height | $I_x$ Moment of inertia $mm^4$ | Iy Moment of inertia $mm^4$ | p Sealing $g/cm^3$ | q Weight per meter g/m | E Module GPa | $f_x$ Bending over a length of 1 m mm | $f_y$ Bending over a length of 1 m mm |
|---|---|---|---|---|---|---|---|---|---|---|---|---|---|---|---|---|
| Aluminium | 1 | — | — | 12 | 7.5 | 0.3 | 0.3 | 11.4 | 6.9 | 110 | 228 | 2.7 | 30.6 | 70 | 4.9 | 2.4 |
| Luran | 2 | — | 0 | 12 | 7.5 | 1.6 | 0.6 | 8.8 | 6.3 | 239 | 722 | 1.07 | 37.0 | 2 | 95.1 | 31.4 |
| S797SE | 3 | — | 0 | 12 | 7.5 | 1.8 | 0.6 | 8.4 | 6.3 | 247 | 769 | 1.07 | 39.7 | 2 | 98.5 | 31.6 |
| | 4 | (Short fibre) | (15) | 12 | 7.5 | 1.6 | 0.6 | 8.8 | 6.3 | 239 | 722 | (1.07) | 39.4 | (2) | 48.6 | 10.8 |
| | 5 | (Short fibre) | (15) | 12 | 7.5 | 1.8 | 0.6 | 8.4 | 6.3 | 247 | 769 | (1.07) | 42.4 | (2) | 48.3 | 10.8 |
| Luran S | 6 | Short fibre | 15 | 12 | 7.5 | 1.6 | 0.6 | 8.8 | 6.3 | 239 | 722 | 1.17 | 40.4 | 6.6 | 31.5 | 10.4 |
| KR2858 G3 | 7 | Short fibre | 15 | 12 | 7.5 | 1.8 | 0.6 | 8.4 | 6.3 | 247 | 769 | 1.17 | 43.4 | 6.6 | 32.7 | 10.5 |
| PP EGF 70 | 8 | Continuous fibre | 70 | 12 | 7.5 | 1.6 | 0.6 | 8.8 | 6.3 | 239 | 722 | ~1.65 | 57.0 | ~2.5 | 11.7 | 3.9 |
| | 9 | Continuous fibre | 70 | 12 | 7.5 | 1.8 | 0.6 | 8.4 | 6.3 | 247 | 769 | ~1.65 | 61.2 | ~2.5 | 12.2 | 3.9 |
| | 10 | Continuous fibre | 70 | 12 | 7.5 | 1.8 | 0.9 | 8.4 | 5.7 | 292 | 798 | ~1.65 | 69.5 | ~2.5 | 11.7 | 4.3 |
| PP EGF 70 | 11 | (Continuous fibre) | (70) | 12 | 7.5 | 1.6 | 0.6 | 8.8 | 6.3 | 239 | 722 | (0.92) | 49.3 | (1.3) | 20.3 | 3.7 |
| | 12 | (Continuous fibre) | (70) | 12 | 7.5 | 1.8 | 0.6 | 8.4 | 6.3 | 247 | 769 | (0.92) | 53.8 | (1.3) | 19.9 | 3.7 |

-continued

| Profile material | Ex. No | Glass fibre type | GF content Component % | B Outer width | H Outer height | $d_v$ Vertical wall thickness | $d_h$ Horizontal wall thickness | b Inner width | h Inner height | $I_x$ Moment of inertia | Iy | p Sealing | q Weight per meter | E Module | $f_x$ Bending over a length of 1 m | $f_y$ |
|---|---|---|---|---|---|---|---|---|---|---|---|---|---|---|---|---|
| | | | | | | mm | | | | $mm^4$ | | $g/cm^3$ | g/m | GPa | mm | |
| PP with sheet metal strip only in the vertical walls | 13 | 0.1 mm thick | | 12 | 7.5 | 1.6 | 0.6 | 8.8 | 6.3 | 239 | 722 | (0.92) | 40.2 | (1.3) | 46.4 | 6.4 |
| | 14 | 1 mm thick | | 12 | 7.5 | 1.8 | 0.6 | 8.4 | 6.3 | 247 | 769 | (0.92) | 117.9 | (1.3) | 18.5 | 2.2 |
| UP EGF 70 | 15 | Continuous fibre | 70 | 12 | 7.5 | 1.6 | 0.6 | 8.8 | 6.3 | 239 | 722 | ~1.90 | 65.7 | ~40 | 8.4 | 2.8 |
| | 16 | Continuous fibre | 70 | 12 | 7.5 | 1.8 | 0.6 | 8.4 | 6.3 | 247 | 769 | ~1.90 | 70.5 | ~40 | 8.7 | 2.8 |

The product descriptions used in the table stand for:

| | |
|---|---|
| Luran S 797SE: | Acrylacid-Styrol-Acrylonitrile (ASA) BASF AG compound polymerisate |
| Luran S KR2858 G3: | BASF AG ASA compound polymerisate with short fibre (0.2 to 0.3 mm) glass fibre proportions (Fibre diameter = 10 to 15 im) |
| PP EGF 70: | Polypropylene resin reinforced with continuous glass fibres (Fibre diameter = 10 to 15 im) |
| UP EGF 70: | Polyester resin reinforced with continuous glass fibres (Fibre diameter = 10 to 15 im) |
| PP: | Non-reinforced polypropylene resin |

Finally, FIGS. 7 *a/b* and 8 *a/b* show two preferred alternatives for pre-fabricating right angled frames for insulating glass elements.

As specified in FIG. 7*a*, a V-shaped cut-out is created in the region of spacer profile 10, which is used to form a corner in which the outer leg remains intact. Cut surfaces 124, 126 of the side walls 16, 18, at an angle of 90° to one another, each inclined at 45° to the surface of leg 22 as far as leg 20, run outwards from a fixed corner point on leg 122.

After preparing the profile's corner area, as shown in FIG. 7*a*, the profile components to the right and left of the corner 122 are bent towards one another until the cut surfaces 124 and 126 meet. The butt joint 128 formed in this way is fused by butt, laser, ultra-sound or high frequency welding or bonding and forms a rigid, sealed, precisely dimensioned joint. When bending the profile components to the right and left of corner 122, it may be heated to assist the bending process if required. This has shown that, particularly because of the lower thickness chosen for leg 22 as specified in the invention and the fibre reinforcement provided as required for the lesser dimension, it is much easier to distort the section for the purpose of forming the corner area without damaging the vapour barrier and the protective layer provided as required on leg 22.

In the alternative procedure, as is obvious from FIGS. 8*a* and *b*, leg 20 remains completely intact and the mitre cut producing the V-shaped opening 130 removes part of leg 22. Both profile components to the right and left of corner 132 are bent away from each other and, on the cut surfaces 134, 136, which now form a straight line, of side walls 16, 18, a corner piece 138 is affixed and bonded using the technology above. It is beneficial if the corner piece 138 has two rectangular tubes which fit firmly into the hollow profile of the spacer to provide additional stabilisation for the corner area. As the internal leg is not broken, the rectangular frame components maintain cohesion. As the corner piece is also formed as a hollow body and provided with the same vapour barrier and coatings as the hollow profile of spacer 10 itself, this gives a continuously vapour tight corner after welding or bonding the corner piece 138 to the spacer profile 10, just as in the first alternative of the case. The pre-fabricated corner piece can already include a filling opening 144 for desiccant, which is tightly sealed after the hollow profile is successfully filled.

I claim:

1. A plastic insulating spacer, said spacer comprising:

a hollow profile with two separate side walls parallel to each other;

two legs extending between the side walls, said legs being substantially perpendicular to the side walls;

wherein said legs and side walls are related by at least one of:

(i) the ratio of the thickness of the legs to the thickness of the side walls being about 0.8 or less, or (ii) the thermal resistivity in the legs being higher than in the side walls.

2. A spacer as specified in claim 1, wherein the thickness ratio is 0.6 or less.

3. A spacer as specified in claim 1, wherein the thickness ratio is 0.4 or less.

4. A spacer as specified in claim 1, wherein one or more parallel links parallel to the side walls are set into the cavity.

5. A spacer as specified in claim 1, wherein at least portions of the plastic are reinforced with reinforcing material.

6. A spacer as specified in claim 5, wherein the percentage of reinforcing material by weight in the plastic of the side walls is higher than in the legs.

7. A spacer as specified in claim 5 wherein the reinforcing material contains fibers.

8. A spacer as specified in claim 7, wherein the reinforcing fibers comprise at least one of glass, carbon, aramide or natural fibers.

9. A spacer as specified in claim 5, wherein the reinforcing material contains particle shaped materials, combined with reinforcing fibers as required.

10. A spacer as specified in claim 9, wherein the particle shaped materials comprise at least one of Wollastonite, mica or talc.

11. A spacer as specified in claim 5, wherein the reinforcing fibers in the side walls are placed mainly along the length of the hollow profile.

12. A spacer as specified in claim 11, wherein the legs are parallel to strip shaped reinforced areas running along the hollow profile.

13. A spacer as specified in claim 7 wherein the reinforcing fibers in the legs are arranged predominantly in a criss-cross pattern.

14. A spacer as specified in claim 13, wherein the reinforcing fibers arranged predominantly in a crisscross pattern are individual short fibers, long fibers or materials made up of linked fibers or fiber lattices.

15. A spacer as specified in claim 5, wherein sheet metal strips are set into the reinforcing material in the side walls.

16. A spacer as specified in claim 15, wherein the sheet metal strips are perforated.

17. A spacer as specified in claim 1, wherein the plastic comprises foam.

18. A spacer as specified in claim 1, wherein the plastic contains fillings to lower the thermal conductivity, said fillings comprising at least one of:

(i) hollow glass balls, or (ii) hollow glass fibers.

19. A spacer as specified in claim 1, wherein the hollow profile is provided with a protective layer on external surfaces of the side walls and, as required, on an outer leg.

20. A spacer as specified in claim 1, wherein the protective layer comprises at least one of:

(i) a vapor barrier layer, (ii) a corrosion protection layer, (iii) a bonding agent layer, or (iv) a UV protection layer.

21. A spacer as specified in claim 19, wherein the protective layer comprises a layer of bonding paint primer.

22. A spacer as specified in claim 19, wherein the protective layer comprises quick-setting epoxy resin.

23. A spacer as specified in claim 19, wherein a diffusion barrier is provided on the outer leg, said diffusion barrier comprising at least one of:

(i) a thin aluminum foil, (ii) a stainless steel foil, (iii) a metal vaporized plastic foil, or (iv) a plastic foil coated with an inorganic-organic compound layer.

24. A spacer as specified in claim 1, wherein a diffusion barrier is incorporated into the plastic of the legs, said diffusion barrier comprising at least one of:

(i) a thin aluminum foil, (ii) a stainless steel foil, (iii) a metal vaporized plastic foil, or (iv) a plastic foil coated with an inorganic-organic compound layer.

25. A spacer as specified in claim 1, wherein a diffusion barrier layer is attached directly to said legs.

26. A spacer as specified in claim 25, wherein an epoxy layer encloses the diffusion barrier.

27. A spacer as specified in claim 25, wherein an epoxy layer is set between the diffusion barrier and the leg.

28. A spacer as specified in claim 23, wherein an epoxy layer encloses the diffusion barrier.

29. A spacer as specified in claim 23, wherein an epoxy layer is set between the diffusion barrier and the leg.

30. A spacer as specified in claim 1, wherein the side walls have at least one of longitudinal or transverse grooves on their outer surfaces.

31. A spacer as specified in claim 1, wherein the side walls have retention agents on their outer surfaces to anchor a sealant, said retention agents comprising at least one of:

(i) indentations, (ii) irregularities, or (iii) undercuts.

32. A spacer as specified in claim 1, wherein the spacer forms a polygon-shaped frame, with the areas forming each corner of the frame containing a V-shaped opening produced by removing an inner leg while leaving an outer leg essentially intact, the side walls themselves tapering towards the corner with the cut surfaces of the V-shaped opening folded inwards to form the frame.

33. A spacer as specified in claim 1, wherein the spacer forms a polygon-shaped frame, with the areas forming each corner of the frame containing a V-shaped opening produced by removing the entire width of an outer leg essentially over the entire height of the side wall, the vertex of the V-shaped opening being on an inner leg, a triangular cap being placed on the opened out legs to form the corner.

34. A spacer as specified in claim 33, wherein the corner seams are firmly joined by at least one of:

(i) butt welding, (ii) laser welding, (iii) ultrasound welding, (iv) high frequency welding, or (v) bonding.

35. A spacer as specified in claim 32, wherein the corner seams are firmly joined by at least one of:

(i) butt welding, (ii) laser welding, (iii) ultrasound welding, (iv) high frequency welding, or (v) bonding.

* * * * *